United States Patent [19]

Bondie

[11] 3,868,886
[45] Mar. 4, 1975

[54] TOOL HOLDING ASSEMBLY
[75] Inventor: Dale J. Bondie, Fowlerville, Mich.
[73] Assignee: Ex-Cell-O Corporation, Detroit, Mich.
[22] Filed: July 5, 1973
[21] Appl. No.: 376,634

[52] U.S. Cl. .............................................. 90/11 D
[51] Int. Cl. ............................................ B23c 5/26
[58] Field of Search ................. 90/11 D; 408/239 A

[56] References Cited
UNITED STATES PATENTS

| | | | |
|---|---|---|---|
| 3,023,675 | 3/1962 | Stephan | 90/11 D |
| 3,177,775 | 4/1965 | Alisauskis | 90/11 D |
| 3,651,739 | 3/1972 | Wolf | 408/239 A |

Primary Examiner—Gil Weidenfeld
Attorney, Agent, or Firm—Reising, Ethington & Perry

[57] ABSTRACT

A tool holding assembly of the type wherein a tool holder is secured to a rotatable spindle by a draw bar. A tool holder seat is defined on the spindle, and the draw bar is mounted on the spindle for axial movement with respect to the spindle between active and inactive positions. The assembly includes tool holder gripping means having a tool holder gripping position for securing the tool holder in the tool holder seat, and a tool holder releasing position permitting the tool holder to be removed from the tool holder seat. The tool holder gripping means is interconnected between the draw bar and spindle such that it assumes the tool holder gripping position when the draw bar is in its active position, and assumes the tool holder releasing position when the draw bar is in its inactive position. The tool holder gripping means includes an expandible and contractible collet, and a cam member operable to expand and contract the collet in response to relative movement between the collet and cam member, the collet being carried by the draw bar, and the cam member being carried by the spindle. The tool holder seat is in the form of a frusto-conical socket, and the tool holder has a shank of complemental, frusto-conical configuration. In order to assure a good frictional engagement between the tool holder shank and socket despite manufacturing errors, an annular recess or groove is formed in the tool holder shank intermediate the ends thereof so that a good fit is provided on at least one side of the groove, and a single line of contact between the shank and socket surfaces will be avoided.

4 Claims, 7 Drawing Figures

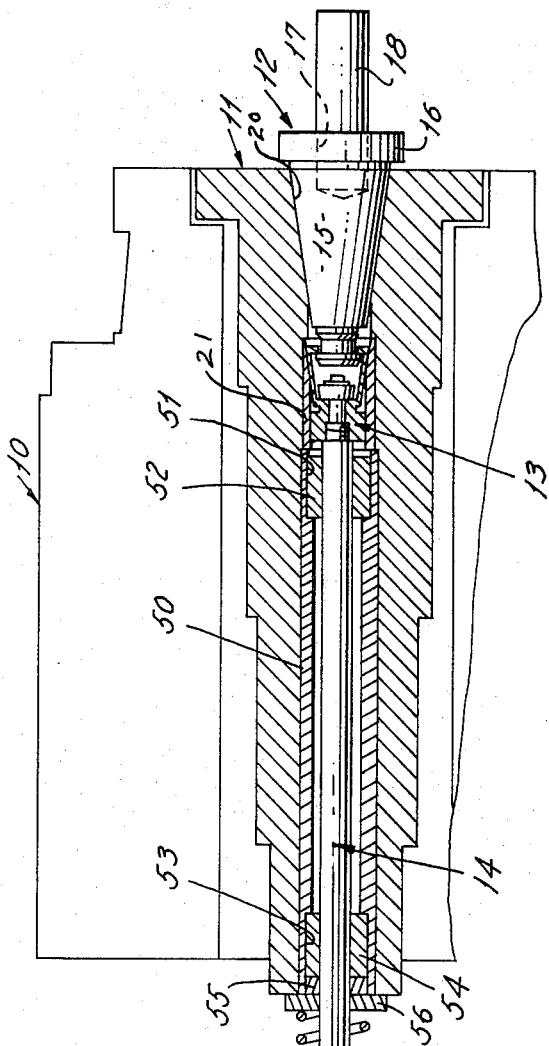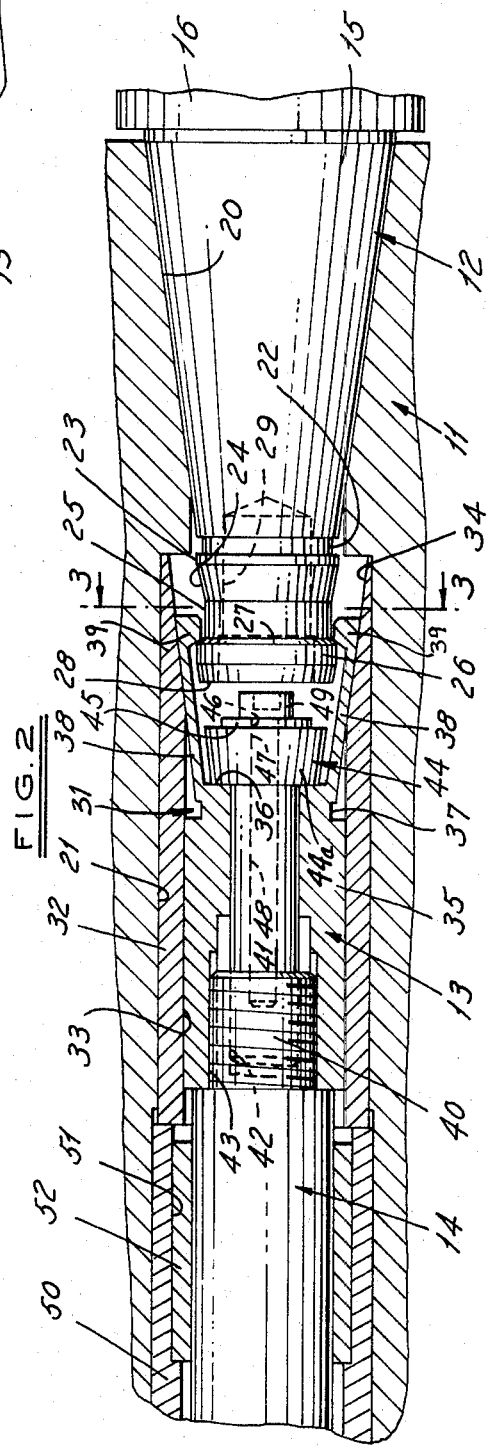

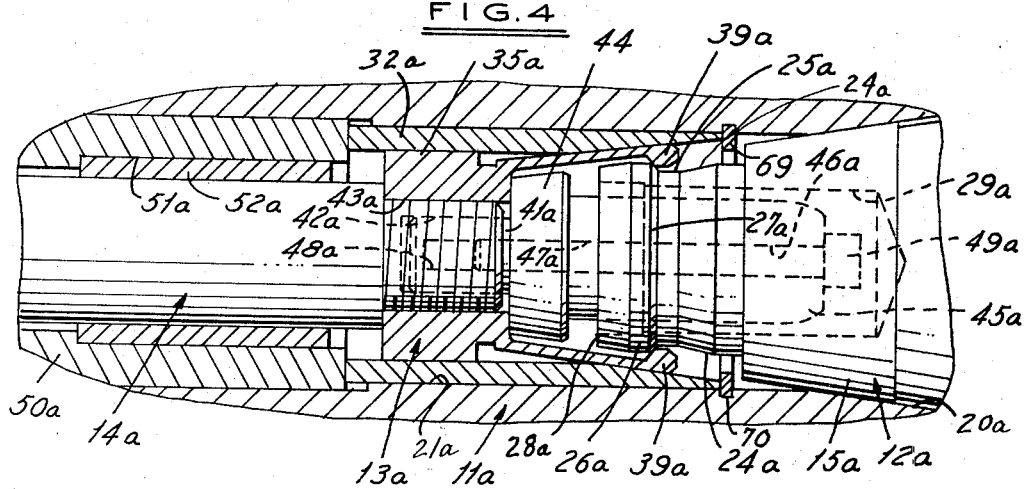
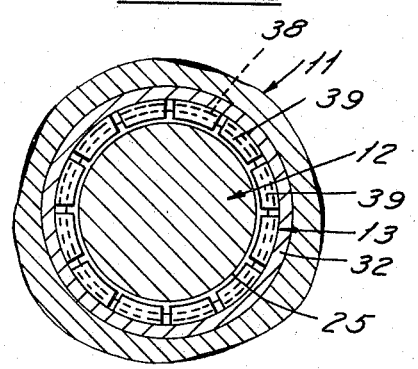

TOOL HOLDING ASSEMBLY

This invention relates generally to tool holding assemblies for use with machine tools in the peformance of various types of operations such as milling, drilling, boring, tapping and the like, and is particularly concerned with tool holding assemblies of the type wherein a tool holder is secured to a rotary spindle by a draw bar which acts to pull the tool holder into tight, frictional engagement with a seat defined in the spindle so that the tool holder, and any tool mounted thereon, rotates with the spindle.

Tools for performing various types of operations such as milling, boring, tapping and the like, are conventionally releasably mounted on the rotary spindle of the machine tool. Each tool is generally secured to a tool holder or adapter which in turn is releasably mounted on the rotary spindle. The tool holder may have a conical, or frusto-conical, shank or body portion seated in a complemental conical, or frusto-conical, socket or recess in a tool holder seat member defined in the spindle, and held in position by a draw bar which in turn is axially movable with respect to the spindle. The draw bar engages the tool holder and pulls the shank into tight, frictional engagement with the socket of the tool holder seat member so that the tool holder, and the tool carried thereby, rotates with the spindle. Examples of machines of this general type are disclosed in U.S. Pat. Nos. 3,516,149 and 3,520,228.

During operation of the machines of the type discussed in the preceding paragraph, it is of course desirable for the operator to be able to quickly remove and install tool holders from and onto the spindles of the machines. For accurate machining operations, it is also desirable that the draw bar apply only tension forces to the tool holder so as not to introduce forces and stresses on the tool holder that would tend to create misalignment between the tool holder (and hence the tool carried thereby) and the rotary axis of the spindle.

With the tool holder shank and socket in the tool holder seat member of complemental tapered or frusto-conical configuration, the resistance to slippage of the tool holder shank with respect to the socket increases with the amount of surface of the tool holder shank in contact with the surface of the socket. If the tool holder shank, or the complemental socket, is only slightly out of round at any location along its length, it is possible for there to be a substantial line contact engagement between the tool holder shank and the socket to increase the likelihood of slippage.

It is an aobject of the present invention to provide a tool holding assembly of the type wherein a draw bar is used to hold a tool holder or the like in frictional engagement with a tool holder seat wherein the tool holder can be quickly and easily installed and removed from the tool holder seat.

A further object of this invention is to provide a tool holding assembly of the type wherein a draw bar is used to maintain a tool holder in frictional, non-rotatable engagement with a tool holder seat defined on a rotatable spindle so that the tool holder rotates with the spindle, and wherein the tool holder can be quickly and easily installed and removed from the spindle, and wherein forces tending to create misalignment between the tool holder and the rotary axis of the spindle are minimized.

Still another object is to provide a tool holding assembly having means defining a tool holder seat with a draw bar mounted for axial movement with respect to the tool holder seat between active and inactive positions, and tool holder gripping means having a tool holder gripping position for securing a tool holder into tight, frictional engagement with the tool holder seat, and a tool holder releasing position permitting the tool holder to be removed from the tool holder seat, the tool holder gripping means assuming the tool holder gripping position when the draw bar is in its active position, and assuming the tool holder releasing position when the draw bar is in its inactive position.

A still further object of the present invention is to provide a rotary tool holder assembly wherein a tool holder seat is defined on a rotary spindle and a draw bar is mounted on the spindle for axial movement with respect to the spindle between active and inactive positions, and tool holder gripping means having a tool holder gripping position for securing a tool holder in the tool holder seat, and a tool holder releasing position permitting the tool holder to be removed from the tool holder seat, the tool holder gripping means assuming the tool holder gripping and tool holder releasing positions when the draw bar is in the inactive and active positions, respectively.

A further object is to provide a tool holder having a shank configuration of tapered or frusto-conical form adapted to be received in a complemental socket of a tool holder seat member wherein a tight, surface-to-surface engagement is assured despite manufacturing errors.

In carrying out the foregoing, and other objects, a tool holder assembly according to the present invention includes means defining a tool holder seat and draw bar support means with a draw bar mounted in the draw bar support means for axial movement between active and inactive positions with respect to the tool holder seat. In order to secure a tool holder in the tool holder seat with a tight, frictional fit, the invention includes tool holder gripping means having a tool holder gripping position for securing a tool holder in the tool holder seat in substantial force fit relationship with the tool holder seat, and a tool holder releasing position permitting the tool holder to be removed from the tool holder seat. The tool holder gripping means has at least two members movable relative to each other in response to movement of the draw bar with respect to the tool holder seat such that the tool holder gripping means assumes the tool holder gripping position when the draw bar is in its active position, and assumes the tool holder releasing position when the draw bar is in its inactive position.

For rotary machining operations such as boring, drilling, tapping, etc., the draw bar is mounted on bearings received in a hollow spindle. The tool holder seat is either formed on, or is provided by, a tool holder seat member non-rotatably mounted in the spindle adjacent one end thereof. When a tool holder is received in a tool seat, and when the draw bar is in its active position, the tool holder gripping means engages the tool holder, and the draw bar pulls the tool holder into tight, frictional engagement with the tool holder seat so that the tool holder rotates with the spindle.

The tool holder gripping means includes an expandable and contractible collet and a cam member operable to expand and contract the collet in response to relative movement between the collet and cam member. In the illustrated embodiments, the collet is carried by the draw bar and the cam member is carried by the spindle so that the collet is expanded and contracted in response to movement of the draw bar relative to the spindle between its active and inactive positions. According to the invention, the collet is expanded and contracted in response to movement of the draw bar between its active and inactive positions so that the collet can grip a tool holder received in the tool holder seat when it is in one of the expanded and contracted positions, and can release the tool holder when it is in the other of its expanded and contracting conditions. In the illustrated embodiment, the arrangement is such that the tool holder is gripped by the collet when the collet is contracted, and the tool holder is released when the collet has expanded.

Other objects, advantages and features of the invention will become apparent from the following description taken in connection with the accompanying drawings in which:

FIG. 1 is a longitudinal view, partially in section, of a machine having a tool holding assembly embodying one form of the present invention;

FIG. 2 is a fragmentary, enlarged view of a portion of a tool holder assembly shown in FIG. 1;

FIG. 3 is a sectional view taken on lines 3—3 of FIG. 2;

FIG. 4 is a view similar to FIG. 2 illustrating a modification of the embodiment of the invention shown in FIG. 2;

Figure 5:
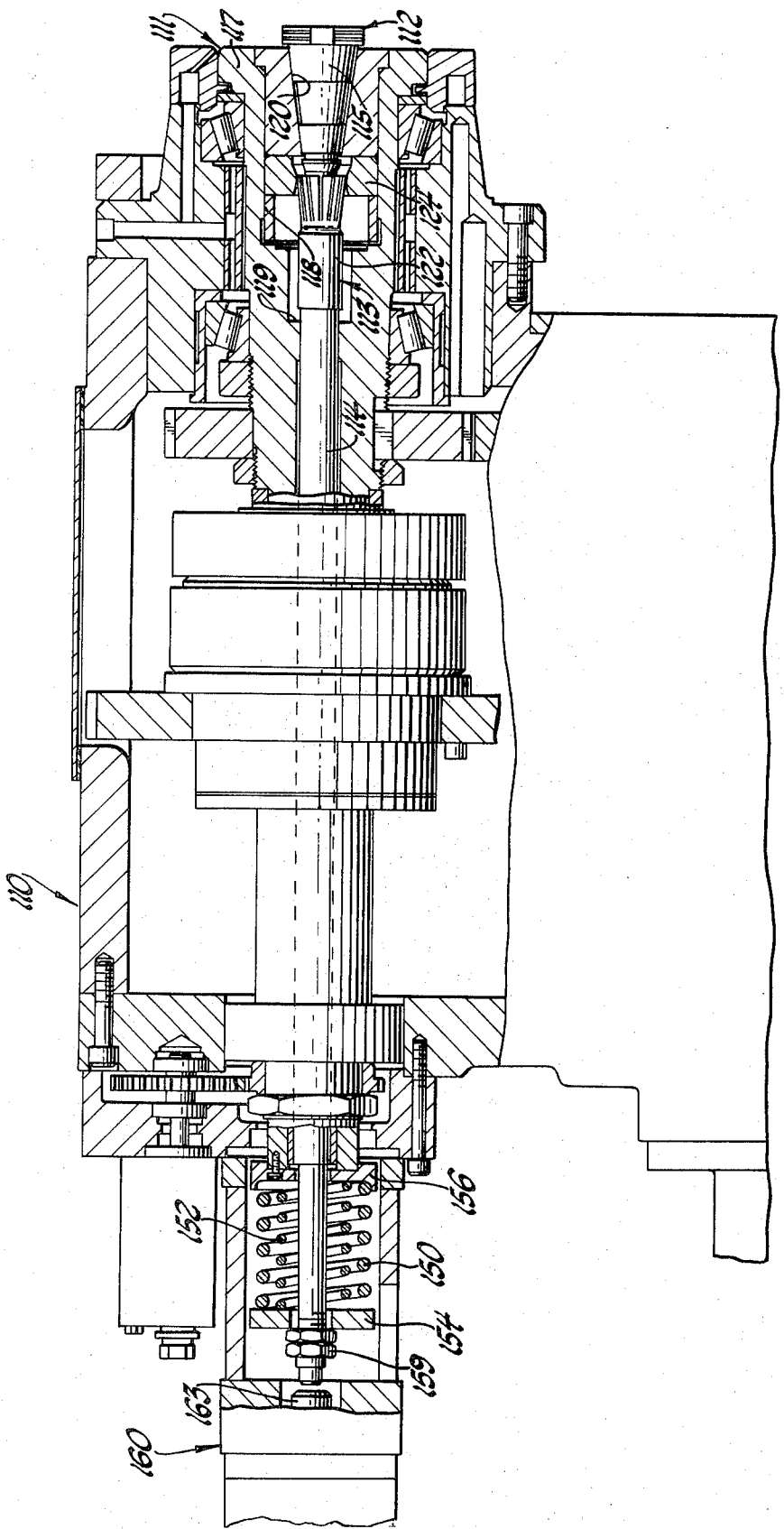
FIG. 5 is an elevational view, partially in section, of a machine incorporating still another tool holding assembly embodying the present invention in its preferred form.

In the embodiment of the invention illustrated in FIGS. 1 through 3, reference numeral 10 collectively designates a spindle head of a machine tool of the type with which the present invention is primarily employed. Rotatively mounted within the spindle head 10 is a spindle collectively designated by reference numeral 11. A tool holder 12 is received in a tool holder seat defined on the spindle, and the tool holder 12 is secured in the tool holder seat with a tight, friction fit by tool holder gripping means designated collectively by reference numeral 13, the tool holder gripping means 13 being interconnected between a draw bar 14 and the spindle 11.

The draw bar 14 is mounted on the spindle 11 for axial movement with respect to the spindle between active and inactive positions, the draw bar being illustrated in the active position in FIGS. 1 and 2. The tool holder gripping means 13 has a tool holder gripping position (the position illustrated in FIG. 2) for securing the tool holder 12 in the tool holder seat defined by the tapered or frusto-conical bore 20 at the outer, or right end of the spindle 11 as viewed in FIG. 1. The tool holder gripping means also has a tool holder releasing position permitting the tool holder 12 to be removed from the tool holder seat 20. The tool holder gripping means 13 is interconnected between the draw bar 14 and the spindle 11 in such a manner that it assumes the tool holder gripping position shown in FIGS. 1 and 2 when the draw bar is in its active position, and assumes the tool holder releasing position when the draw bar is in its inactive position, a position to the right of the position shown in FIG. 1 with respect to the spindle 11. Thus, with a tool holder seated in the tool holder seat or socket 20, the draw bar is in its active position when the gripping means grips the tool holder so that the draw bar pulls the tool holder into the seat 20.

In the embodiment of FIGS. 1 and 2, the tool holder 12 comprises a body or shank 15 of tapered or frusto-conical configuration. Formed on the large diameter end of the shank 15 is a flange 16. Extending inwardly from the large diameter end of the shank 15 of the tool holder 12 is an axial bore 17, and a mounting shaft 18 of a conventional cutting tool (not shown) is received in the axial bore 17. The frusto-conical shank 15 is received in a tool holder seat defined by a socket 20 which is of tapered or frusto-conical configuration complemental to the configuration of the shank 15. The frusto-conical socket 20 defines a tool holder seat on the spindle for the tool holder 12.

A tool holder seat 20 communicates with a longitudinally extending bore 21 extending through the spindle 11 and opens at the left or rear end thereof. The draw bar 14 is received in the bore 21 within the spindle 11.

Projecting into the bore 21 from the small diameter end of the shank or body portion 15 of the tool holder 12 is a draw bar connection portion 22. The draw bar connector portion 22 is formed with an enlarged end portion 26 defining a shoulder 27 which is engageable by the tool holder gripping means 13 in a manner set forth below. The draw bar connector portion 22 further includes a flared ramp portion 24 which is spaced axially from the enlarged end portion 26, the ramp portion 24 projecting radially outwardly from the connector portion in the direction of the large diameter end portion of the tool holder body or shank portion 15 (or toward the right as viewed in FIG. 2). A groove or reduced diameter portion 25 is thus defined between the shoulder 27 and the ramp 24. The shoulder 27 tapers radially inwardly from the front edge of the enlarged collar or end portion 26 to the surface of the groove 25. In FIG. 2, the rear or left end of the draw bar connector portion is indicated by reference numeral 28, and an axial bore 29 extends inwardly from the rear end 28. The outer, large diameter portion of the ramp 24 is defined by a cylindrical collar 23. Thus, the ramp 24 extends axially and radially from the groove 25 to the cylindrical portion or collar 23.

The tool holder gripping means 13 includes a cam member 32 in the form of a sleeve member received in the bore 21 of the spindle 11. The cam member 32 is in the form of a sleeve having an inner surface 33 of uniform diameter extending from the left end of the sleeve member 32, that is, the end opposite the tool holder 12, and connecting with a tapered cam surface 34 extending inwardly from the end of the cam member 32 adjacent to the tool holder 12. The cam surface 34 is in the form of a frustoconical surface having its large diameter end adjacent the end of the sleeve member 32, and its small diameter end merging with the inner surface 33 of the sleeve. Thus, the cam surface 34 diverges outwardly from the bore 33 of the cam member or sleeve 32.

The tool holder gripping means further includes an expandable and contractible collet 31 having a body portion 35 from which extend a plurality of radially expandable and contractible spring fingers 38. The spring fingers 38, in the illustrated embodiment, are expanded in their unstressed condition and project axially and radially outwardly from one end of the body portion 35, and are resiliently urged by the cam member 32 to their contracted position upon movement of the draw bar to its active position from its inactive postion as will be set forth in greater detail below. The cam member 32 concentrically receives the collet 35, and the cam surface 34 slidably engages the spring fingers 38.

In FIG. 2, the spring fingers 38 are in their radially contracted position due to their location near the small diameter portion of the cam surface 34. It is apparent that by shifting the collet toward the right with respect to the cam sleeve member 32 from the position shown in FIG. 2, the enlargement of the diameter of the cam surface 34 will permit the spring fingers 38 to radially expand. Projecting radially inwardly from the free ends of each of the spring fingers 38 is a lug 39 which, as illustrated in FIGS. 2 and 3, engages the shoulder 27 on the enlarged portion 26 of the draw bar connector portion 22 of the tool holder 12 when the gripping means 13 is in the tool holder gripping position.

As shown in FIG. 2, the draw bar 14 has a threaded stub shaft 40 projecting from its inner end (the end received in the sleeve member 32), and the body portion 35 of the collet is internally threaded to receive the threaded shaft 40. Thus, the collet is carried by the draw bar 14, and, when the draw bar 14 moves from the active position shown in FIG. 2 toward the right to its inactive position, the collet 35 is carried by the draw bar to a position such that the spring fingers 38 can expand and release the tool holder from the draw bar.

In order to eject the tool holder 12 from the tool holder seat 20, a tool holder ejector is also carried by the draw bar 14 and is operable to engage the draw bar connector portion 22 and push the tool holder 12 from its tight, frictional engagement with the tool holder seat 20 as the draw bar moves from its active postion of FIG. 2 to its inactive position. The ejector 44 includes a shank portion 41 which extends through an opening in the body portion of the collet into threaded engagement with the shaft 40, the shaft 40 having an internally tapped hole 42 for receiving the shank 41. The ejector further includes a head portion 44a operable to engage the end 28 of the connector portion 22 as the draw bar 14 moves toward the right from the position of FIG. 2 to disengage the tool holder 12 from the tool holder seat 20. The head 44a of the ejector is seated against the end face 36 of the body portion of the collet and is surrounded by the spring fingers 38. The spring fingers 38 project integrally from a front end portion 37 of the collet body portion 35.

The ejector member 44 is secured against displacement from the draw bar 14 by a bolt 49 extending through a bore 46 and a washder 45 washer the outer end of the head portion 44 of the ejector 44a and through a bore 47, 48 in the head portion 44 and shank portion 41 of the ejector. The rear or left end of the bore 48 in the shank 41 is threaded so as to permit the bolt 49 to lock the ejector head 44 in position on the shank 41. The shank 41 is threadedly mounted in an internally threaded hole 42 formed in the threaded stub shaft 40 projecting from the end of the draw bar 14.

As shown in FIG. 1, the draw bar 14 is mounted in an elongated tubular sleeve 50 which in turn is received in the spindle bore 21. The spindle bore 21 has a reduced diameter portion adjacent to the tool holder seat 20, and the cam sleeve member 32 is received in the reduced diameter portion of the bore 21. Conventional bushing or bearing means 52 and 54 are received and stepped to diameter portions 51 and 53 of the draw bar sleeve, and the draw bar 14 is slidably mounted in the bearing elements 52 and 54. A conventional thrust bearing washer 55 is mounted on the draw bar 14, and is positioned within the bore 53 and against the rear end of the bearing element 54.

The draw bar 14 is biased toward the left to its active position, the position shown in FIGS. 1 and 2, by a spring 57 seated between spring plates 58 and 56. The spring plate 56 is seated against the left end of the spindle as viewed in FIG. 1, and slidably receives the draw bar 14. The spring plate 58 is biased by the spring 57 into engagement with lug nuts 59 threadably mounted on the end of the draw bar. As pointed out above, spring 57 biases the draw bar 14 to its active position to cause the spring fingers 38 of the collet to be contracted by the cam surface 34 of the cam member 32. In this position, that is, the tool holder gripping position, the lugs 39 engage the shoulder 27 and spring 57 causes the draw bar to force the tool holder 12 into tight frictional engagement with the spring seat 20.

In order to actuate the draw bar from its active to inactive position, a fluid motor designated collectively by reference numeral 60 in FIG. 1 is activated to move the draw bar 14 toward the right against the force of spring 57. The fluid motor 60 includes a piston 61 received in a cylinder and fixed to a piston rod 62. Mounted on the forward end of the piston rod 62 is a draw bar actuating piston 63, and mounted on the piston rod 62 on the opposite end of the cylinder and actuating member 63 is a pair of axially spaced switch actuating dogs 65 and 66. Received in the space between the dogs 65 and 66 is an actuating arm 67 for a microswitch 68. Switch 68 may be interconnected in the controls circuitry of the machine 10.

It is apparent that the introduction of fluid pressure to the left end side of piston 61 as viewed in FIG. 1 cause the piston rod to move toward the right until the actuating member 63 engages the left, or rear end of the draw bar 14. Continued movement of the piston rod 62 toward the right will compress spring 57 and cause the draw bar 14 to move to its inactive position to permit the collet spring fingers 38 to radially expand because of their sliding engagement with the outwardly tapering cam surface 34 to permit the lugs 39 to release the shoulder 27 of the draw bar connector portion of the tool holder. Further movement of the draw bar 14 toward the right causes the head 44 of the tool holder ejector to engage the end 28 of the tool holder and urge the tool holder toward the right out of engagement with the tool holder seat 20. Travel of the piston rod 62 toward the right is limited by engagement of the microswitch actuating arm 67 by the dog 66.

The draw bar 14 is actuated by the fluid motor 60 to its inactive position in order to install a tool holder 12 onto the spindle. In the inactive position of the draw bar, the spring fingers 38 are in their radially expanded condition located axially to the right of the position shown in FIG. 2 with respect to the cam member 32. Tool holder 12 can be inserted into the socket or seat 20 until the shoulder 27 moves past the expanded lugs 39. Actuation of the fluid motor 60 to retract the piston rod 62 to the left as viewed in FIG. 1 causes the spring 57 to move the draw bar to the active position illustrated in FIGS. 1 and 2, and the cam surface 34 causes the lugs 39 to radially contract to engage the shoulder 27 and tightly pull the tool holder 12 into engagement with the tool holder seat or socket 20. The frictional engagement between the surface of the tool holder shank or body portion 15 with the tapered socket 20 produces a driving relationship between the spindle and the tool holder so that the tool holder rotates with the spindle. All forces between the draw bar and tool holder 12, other than the tension forces applied by the lugs 39 of the spring fingers 38 are substantially eliminated so that the draw bar is effectively prevented from introducing any undesirable forces onto the tool holder 12.

FIG. 4 illustrates a slight modification of the construction shown in FIGS. 1, 2 and 3. The parts of FIG. 4 which are indentical to the parts of the embodiment of FIGS. 1 through 3 are marked the same reference numerals followed by the small letter "a." A construction shown in FIG. 4 is substantially the same as the construction in FIGS. 1 through 3 with the exception that the front end of the cam member 32 is retained in place by a retainer ring 69 which is seated in a groove 70 formed in the bore 21a. The embodiment of FIGS. 1 through 3, on the other hand, the front end of the cam sleeve member 32 rests against a shoulder form between the bore 21 and a tapered bore 20.

An additional difference in the modification of FIG. 4 is that the washer 45 of the construction shown in FIGS. 1 through 3 is extended in length axially to form a guide means in the form of a guide shaft 25a which slidably engages the axial bore 29a formed in the rear end of the tool holder 12a for guiding the tool holder 12a inwardly as it is being positioned in the socket 20a.

In summary, FIGS. 1 through 4 illustrate an embodiment of a rotary tool holding assembly according to the invention comprising a rotary spindle 11, means defining a tool holder seat 20 on the spindle 11, a draw bar 14 mounted on the spindle for axial movement with respect to the spindle between the active position shown in FIGS. 1 and 2 and an inactive position. Tool holder gripping means 13 is provided having a tool holder gripping position as shown in FIGS. 1 and 2 for securing a tool holder 12 in the tool holder seat 20. The tool holder gripping means 13 also has a tool holder releasing position permitting the tool holder 12 to be removed from the tool holder seat 20. The tool holder gripping means 13 is interconnected between the draw bar 14 and spindle 11 such that it assumes the tool holder gripping position when the draw bar is in the active position illustrated in FIGS. 1 and 2, and assumes the tool holder releasing position when the draw bar is in its inactive position. The tool holder gripping means 13 includes an expandable and contractible collet 35 and a cam member 32 operable to expand and contract the collet in response to relative movement between the collet and cam member.

To eject the tool holder 12 from the tool holder seat 20, the draw bar 14 is actuated by the hydraulic motor 60 to its inactive position in which it moves axially to the right as viewed in FIG. 1 with respect to the spindle to sequentially permit the spring fingers 38 of the collet to expand by sliding toward the enlarged diameter portion of the cam surface 24 and bring the head 44 of the ejector into engagement with the end 28 of the draw bar connector portion of the tool holder 12. The flared ramp 24 on the draw bar connector portion of the tool holder 12 further assures that the spring fingers 38 will expand to permit the enlarged end portion 26 to pass the lugs 39 when pushed by the ejector head 44.

Figure 6:
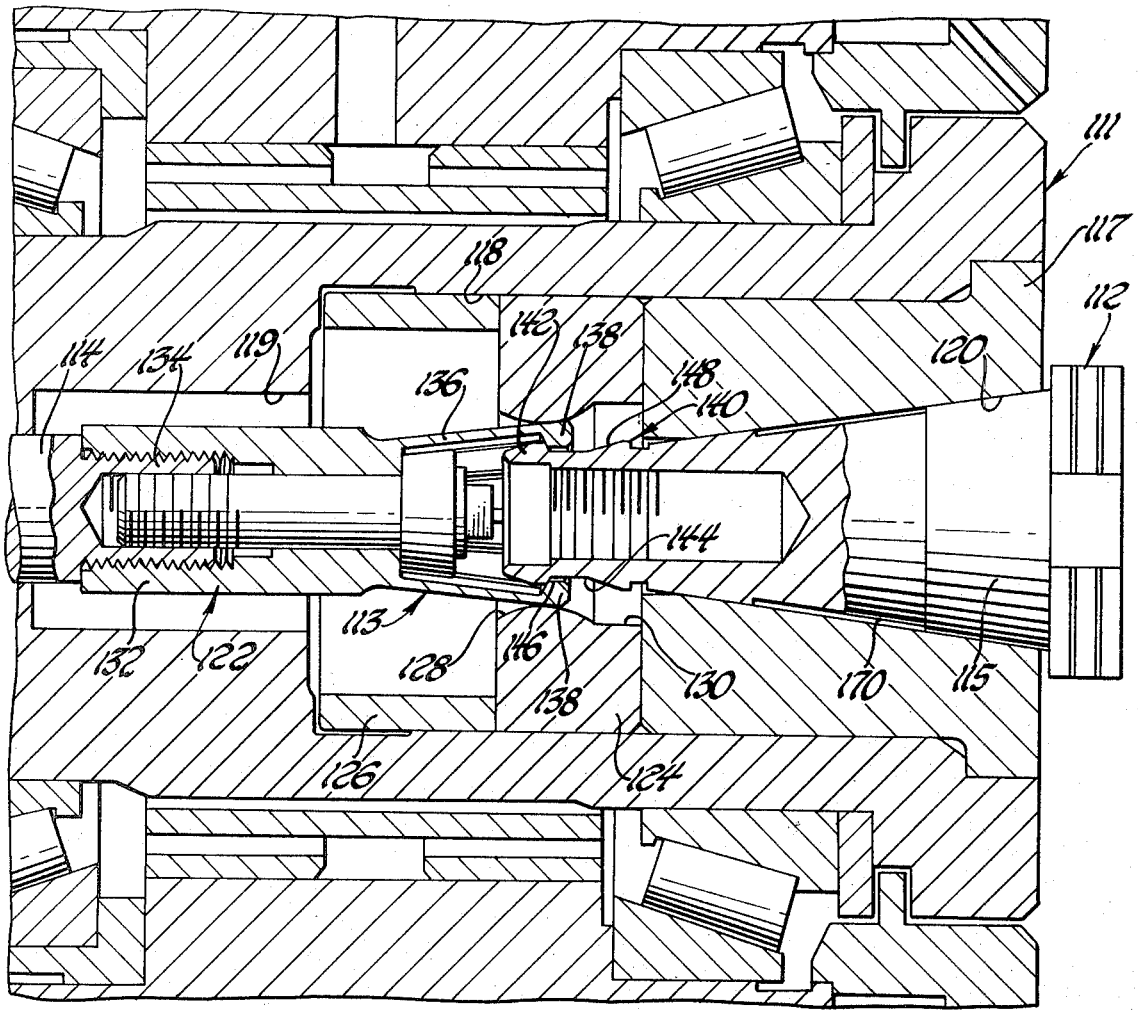
FIG. 6 is an enlarged fragmentary view of a portion of the tool holding assembly of FIG. 5 illustrating the tool holding assembly in one position.
Figure 7:
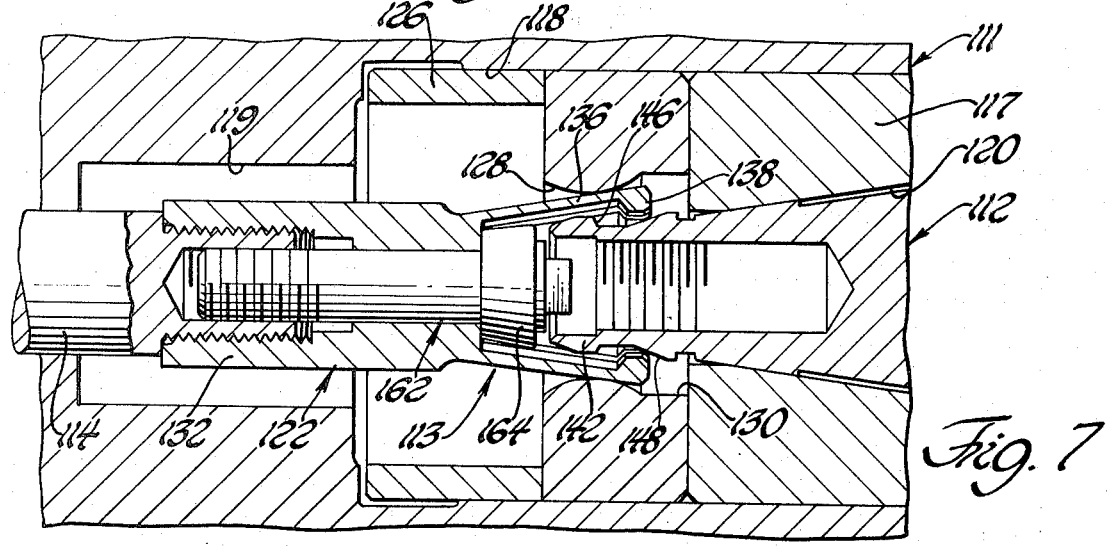
FIG. 7 is a view similar to FIG. 6 with the tool holding assembly in another position.

FIGS. 5 through 7 illustrate a preferred embodiment of the invention including several modifications of the previously described embodiments. With reference to FIGS. 5 through 7, reference numeral 110 collectively designates the spindle head of a machine tool. Rotatably mounted in the spindle head 110 is a spindle 111. As shown in FIG. 5, the tool holder 112 is mounted in a tool holder seat member 117, the tool holder seat member 117 being non-rotatably secured to the spindle 111. Tool holder 112 has a frusto-conical or tapered shank portion 115 received in a complemental socket or seat 120 on the tool holder seat member 117.

The tool holder 112 is pulled into tight, frictional engagement with the seat or socket 120 by the draw bar 114 which is connected with the tool holder 112 by tool holder gripping means designated collectively by reference numeral 113.

The outer, or right hand end of the spindle 111 as viewed in FIG. 5, is formed with a stepped bore or cavity 118 having a reduced diameter portion 119. The tool holder gripping means 113 is received in the cavity 118 and includes an expandable and contractible collet 122 and a cam member 124 cooperable with the collet 122. The collet 122, as shown in FIG. 6, has a construction similar to the construction of the collet 31 in the previously described embodiment. The cam member 124 is received between a cylindrical spacer 126 having one end engaging the wall of cavity 118 at its juncture with the reduced portion 119 and its other end engaging the cam member 124. The end of the cam member 124 opposite the spacer 126 engages the end of the tool holder seat member 117.

Referring to FIGS. 6 and 7, the cam member 124 is in the form of a ring member and has an inner cam surface 128 in the form of an annular, convexly curved section projecting radially inwardly from the cam member. A cylindrical bore 130 extends from the edge of the cam surface 128 to the end of the cam member 124 adjacent to the tool holder seat member 117.

The coolet 122 has a body portion 132 which is internally threaded to receive the threaded stub shaft 134 projecting from the end of the draw bar 114 in such a manner that the collet 122 is carried by the draw bar. A plurality of radially expandable and contractible spring fingers 136 project from the body portion 132, and are concentrically received by the cam member 124 and slidably engage the cam surface 128. Projecting radially inwardly from the ends of each of the spring fingers 136 is a lug 138.

In the position of the parts shown in FIG. 6, the free ends of the spring fingers 136 are engaged by the cam surface 128 at substantially its smallest diameter to cause the spring fingers 136 to assume a radially contracted position. Movement of the draw bar 114 toward the right relative to the spindle 111 causes the ends of the spring fingers 136 to move into the enlarged space defined by the bore 130 permitting the spring fingers 136 to expand radially from the position shown in FIG. 6. Hence, with cam member 124 carried by the spindle, and the collet 122 carried by the draw bar, axial movement between the draw bar and spindle causes radial expansion and contraction of the collet 122.

Projecting from the small diameter end of the shank portion 115 of the tool holder 112 is a draw bar connector portion 140. The draw bar connector portion 140 includes an enlarged end portion 142 and a groove 144, one side wall of the groove being defined by a shoulder 146 at the enlarged end portion 142, and the other side wall being defined by a flared ram portion 148, the draw bar connector portion 140 being identical in construction to the corresponding portion of the tool holder of the previously described embodiment.

The tool holder gripping means 113 is shown in the tool holder gripping position in FIG. 6 wherein the spring fingers 136 are held in their contracted position by the cam surface 128 so that the lugs 138 engage the shoulder 146, and a tension force toward the left is exerted by the draw bar acting to pull the tool holder 112 into tight frictional engagement with the socket 120. Movement of the draw bar toward the right from the position shown in FIG. 6 to the position shown in FIG. 7 causes the spring fingers 136 to expand and release the tool holder.

As shown in FIG. 5, the draw bar 114 is biased toward the left, or active position, by springs 150 and 152 seated between spring seat members 154 and 156. Movement of the draw bar from the active position to the inactive position is caused by actuation of a hydraulic motor 160 (which may be identical to the hydraulic motor 60 of the previously described embodiment) having an actuating member 163. Actuation of the motor 160 causing the actuating member 163 to engage the end of the draw bar compresses the springs 150 and 152 and urges the draw bar, together with the collet 122, toward the right with respect to the spindle 111 to cause the spring fingers 136 to radially expand as shown in FIG. 7. The ram portion 148 (FIG. 7) assures that the lugs 138 and spring fingers 136 will expand as the collet 122 moves toward the right to permit the enlarged end portion 142 2f the tool holder to pass through the spring fingers and lugs 138. An ejector assembly 162, identical in construction to the ejector mechanism shown in FIG. 2, is carried by the draw bar 114 and has a head portion 164 that engages the end of the tool holder 112 to push the tool holder 112 out of engagement with the socket 120. Thus, actuation of the hydraulic motor 160 to more the draw bar 114 from the active to inactive positions sequentially cause expansion of the collet 122 to release the tool holder 112 from the collet and ejection of the tool holder 112 from the surface of the spring seat or socket 120.

In the active position of the draw bar, the springs 150 and 152 exert a tension force on the tool holder 112 through the shoulder 126 due to the engagement therewith by the lugs 138 to pull the shank or body portion 115 into tight, frictional engagement with the surface of the socket 120. The body portion 115 is thus held in a substantial force fit relationship with respect to the socket 120 so that rotation of the spindle 111 and tool holder member 117 cause the tool holder 112 to rotate therewith. The resistance to slippage between the tool holder body portion 115 and the tool holder socket 120 depends upon the amount of surface-to-surface contact between the shank or body portion 120 of the tool holder and the surface of the socket 120 defining the tool holder seat. Manufacturing errors resulting in either of the socket or tool holder body portion being out of round will increase the likelihood of there being a substantial line contact engagement between the body portion and the socket with a consequent substantial increase in the likelihood of slippage occurring between the tool holder and spindle. To reduce the likelihood of the line contact engagement between the body portion 115 and socket 120, the body portion 115 is formed with a groove 170 intermediate the ends thereof to assure that a good frictional engagement is obtained between at least one of the portions of the body portion 115 on either side of the groove 170 with the surface of the socket 120. The provision of the groove 170 has been found to increase the reliability of the tool holder maintaining non-rotatable relationship with the tool holder seat 120 and to decrease the likelihood of misalignment occuring between the tool holder and the axis of rotation of the spindle.

In summary, the preferred embodiment of FIGS. 5 through 7 includes a rotary spindle 111, means 117 defining a tool holder seat 120 on the spindle 111, a draw bar 114 mounted on the spindle for axial movement with respect to the spindle between active and inactive positions, and tool holder gripping means 113 having a tool holder gripping position for securing a tool holder 112 in the tool holder seat 120, and a tool holder releasing position for permitting the tool holder to be removed from the tool holder seat 120. The tool holder gripping means 113 is interconnected between the draw bar 114 and spindle 111 such that it assumes the tool holder gripping position of FIG. 6 when the draw bar is in its active position, and assumes the tool holder releasing position (FIG. 7) when the draw bar is in its inactive position. The tool holder gripping means includes an expandable and contractible collet 122 and a cam member 124 operable to expand and contract the collet 122 in response to relative movement between the collet and cam member.

In the embodiment of FIGS. 5 and 7, the collet is carried by the draw bar and the cam member is carried by the spindle, the collet being contracted when the draw bar is in its active position and expanded when the draw bar is in its inactive position. The spring fingers 136 are expanded in their unstressed condition and project axially and radially outwardly from the body portion 132 of the spindle.

The advantages of the construction shown particularly in FIGS. 5 and 7 includes (1) the speed of removing the tool holder 112 from the tool holder seat member 117 upon movement of the draw bar toward the right to its inactive position causing the sequential release of the tool holder by the spring finger lugs 138 and ejection of the tool holder when the tool holder is struck by the ejector head 164, and (2) the drive path from the spindle to the tool holder 112 bypasses the connection between the tool holder and draw bar to improve he accuracy because the collet forces are exerted substantially solely in a tension direction and are separate from the friction forces between the tool holder shank 115 and socket 120, which causes the tool holder to rotate with the spindle.

While several specific forms of the invention are illustrated in the accompanying drawings and are described in the foregoing specification, it should be understood that the invention is not limited to the exact construction shown. To the contrary, alterations in the construction and arrangement of parts, all falling within the scope and spirit of the invention, would be apparent to those skilled in the art.

The embodiments of the invention in which an exclusive property or privilege is claimed are defined as follows:

1. In a tool holder and tool holder seat assembly of the type wherein the tool holder seat is non-rotatably fixed to the rotary spindle of a machine tool and the tool holder is held in frictional non-rotatable engagement with the tool holder by a draw bar; said tool holder seat comprising a frusto-conical socket; said tool holder comprising a frusto-conical shank complemental to said socket and a draw bar connector portion projecting from the small diameter end of said shank, said draw bar connector portion having an enlarged end portion spaced from the small diameter end of said shank and defining a shoulder adapted to be engaged by expandable and contractible gripping means, a flared ramp portion on said draw connector portion spaced axially from said enlarged end portion toward the small diameter end of said shank, said ramp portion tapering radially and axially outwardly in the direction of the large end of said shank for causing expansion of such expandable and contractible gripping means when engaged thereby to release the tool holder therefrom.

2. An assembly as claimed in claim 1 wherein an annular groove is formed in said tool holder shank intermediate the ends thereof such that said tool holder shank engages the socket on both sides of said groove when said tool holder is seated in said socket.

3. A rotary tool holding assembly comprising: a rotary spindle; means defining a tool holder seat on said spindle; a draw bar mounted on said spindle for axial movement with respect to said spindle between active and inactive positions; and tool holder gripping means having a tool holder gripping position for securing a tool holder in said tool holder seat and a tool holder releasing position permitting a tool holder to be removed from said tool holder seat; asid tool holder gripping means being interconnected between said draw bar and spindle such that it assumes said tool holder gripping position when the draw is in its active position, and assumes said tool holder releasing position when the draw bar is in its inactive position; said tool holder gripping means including an expandable and contractible collet; said tool holder gripping means further including a cam member operable to expand and contract said collet in response to relative movement between said collet and cam member; said collet and cam member being movable with respect to each other in response to movement of said draw bar between its active and inactive positions such that said collet is contracted when the draw bar is in its active position and is expanded when the draw bar is in its inactive position; said collet being carried by said draw bar and said cam member being carried by said spindle; said collet comprising a body portion secured to said draw bar and a plurality of radially expandable and contractible spring fingers projecting from said body; said spring fingers being expanded in their unstressed condition and projecting axially and radially outwardly from said body portion, and being resiliently urged by said cam member to their contracted position upon movement of said draw bar to its active position; said cam member concentrically receiving said collet and having an inner cam surface slidably engaging said spring fingers; said tool holder seat comprising a tapered socket coaxial with said spindle and with the large diemater end of said socket located adjacent the outer end of said spindle; a tool holder having a body portion tapered complementally with and receivable in said tapered socket, said tool holder further including a draw bar connector portion projecting from the small end of said body portion; said body portion being formed with a groove intermediate the ends thereof; a radially inwardly projecting lug formed on the free end of each of said spring fingers for engaging said draw bar connector portion when said collet is contracted; said draw bar connector portion having an enlarged end portion defining a shoulder engageable by the lugs of said spring fingers when said collet is contracted such that said draw bar pulls said tool holder into said tool holder seat in its active position; and a flared ramp portion on said draw bar connector portion spaced axially from said enlarged end portion, said ramp portion projecting radially outwordly from said connector portion in the direction of the large end of said tool holder to assure expansion of said spring fingers as the draw bar moves to its inactive position.

4. A rotary tool holding assembly comprising: a rotary spindle; means defining a tool holder seat on said spindle; a draw bar mounted on said spindle for axial movement with respect to said spindle between active and inactive positions; and tool holder gripping means having a tool holder gripping position for securing a tool holder in said tool holder seat, and a tool holder releasing position permitting a tool holder to be removed from said tool holder seat; said tool holder gripping means being interconnected between said draw bar and spindle such that it assumes said tool holder gripping position when the draw bar is in its active position, and assumes said tool holder releasing position when the draw bar is in its inactive position; said tool holder gripping an expandable and contractible collet; said tool holder gripping means further including a cam member operable to expand and contract said collet in response to relative movement between said collet and cam member; said collet and cam member being movable with respect to each other in response to movement of said draw bar between its active and inactive positions such that said collet is contracted when the draw bar is in its active position and is expanded when the draw bar is in its inactive position; said collet being carried by said draw bar and said cam member being carried by said spindle; said collet comprising a body portion secured to said draw bar and a plurality of radially expandable and contractible spring fingers projecting from said body; said spring fingers being expanded in their unstressed condition and projecting axially and radially outwardly from said body portion, and being resiliently urged by said cam member to their contracted position upon movement of said draw bar to its active position; said cam member concentrically receiving said collet and having an inner cam surface slidably engaging said spring fingers; said cam surface comprising an annular, convexly curved section projecting radially inwardly from said cam member; and said cam member further including a cylindrical bore extending from said cam surface to the end of said cam member adjacent said tool holder seat, the free ends of said spring fingers being received in said bore when the draw bar is in its active position said tool holder seat comprising a tapered socket coaxial with said spindle and with the large diameter end of said socket located adjacent the outer end of said spindle; a tool holder having a body portion tapered complementally with and receivable in said tapered socket, said tool holder further including a draw bar connector portion projecting from the small end of said body portion; a radially inwardly projecting lug formed on the free end of each of said spring fingers for engaging said draw bar connector portion when said collet is contracted; said draw bar connector portion having an enlarged end portion defining a shoulder engageable by the lugs of said spring fingers when said collet is contracted such that the said draw bar pulls said tool holder into said tool holder seat in its active position; and a flared ramp portion on said draw bar connector portion spaced axially from said enlarged end portion, said ramp portion projecting radially outwardly from said connector portion in the direction of the large end of said tool holder to assure expansion of said spring fingers as the draw bar moves to its inactive position.

* * * * *